United States Patent [19]

DeKoven et al.

[11] Patent Number: 5,073,461

[45] Date of Patent: Dec. 17, 1991

[54] TRIBOCHEMICAL METHOD OF PRODUCING AN OXIDIZED SURFACE ON A CERAMIC OR METAL-CERAMIC

[75] Inventors: Benjamin M. DeKoven; Patrick L. Hagans, both of Midland, Mich.

[73] Assignee: The Dow Chemical Company, Midland, Mich.

[21] Appl. No.: 441,851

[22] Filed: Nov. 27, 1989

[51] Int. Cl.$^5$ .......... B32B 9/00; B32B 19/00; B05D 3/00; B23K 1/20

[52] U.S. Cl. .................. 428/698; 428/702; 427/11; 427/294; 228/114

[58] Field of Search ............ 427/11, 294, 369; 156/73.5; 228/3.1, 114, 116; 148/284, 285; 428/698, 702

[56] References Cited

U.S. PATENT DOCUMENTS

| | | | |
|---|---|---|---|
| 4,196,837 | 4/1980 | Burkart et al. | 228/3.1 |
| 4,522,453 | 6/1985 | Lammer et al. | 428/698 |
| 4,608,098 | 8/1986 | Hale | 148/285 |
| 4,709,844 | 12/1987 | Sekiguchi et al. | 228/3.1 |
| 4,804,438 | 2/1989 | Rhodes | 427/294 |
| 4,892,849 | 1/1990 | Lankford, Jr. | 428/689 |

OTHER PUBLICATIONS

Asle Transaction, vol. 22, 3, 245–256 (1978).
Wear, 105, 29–45 (1985).
Nasa Technical Memorandum 81547 (1981).

*Primary Examiner*—Michael Lusignan
*Assistant Examiner*—Diana L. Dudash

[57] ABSTRACT

Novel ceramic or metal-ceramic articles having an oxidized surface are produced by a tribochemical method. The oxidized surface is produced by initially wear scarring, under high vacuum, opposed, articulating ceramic or metal-ceramic surfaces and, thereafter, continuing the wear scarring in the presence of oxygen or air at less than atmospheric pressure. A method of welding ceramic or metal-ceramic articles is also disclosed.

13 Claims, No Drawings

TRIBOCHEMICAL METHOD OF PRODUCING AN OXIDIZED SURFACE ON A CERAMIC OR METAL-CERAMIC

BACKGROUND OF THE INVENTION

1. Field of the invention

This invention relates to ceramic and ceramic-metal articles having an oxidized surface and to welded ceramic and ceramic-metal articles.

2. Description of the prior art

Since World War II, lubrication has emerged as a science. Fundamental contributions had been previously made by DaVinci, Coulomb, Reynolds, Amontons, Hardy, Bowden, and Tabor. A number of efforts aimed at trying to understand the fundamental nature of surfaces and their interactions in rubbing, rolling and sliding contact resulted in the development, after World War II, of liquid lubricants, as substitutes for the conventionally used mineral oils, in the aircraft industry. Study of the fundamental and basic structure of organic lubricant compounds became important as a means of understanding the basic mechanism involved in the lubrication of solid surfaces. In addition, the design of synthetic lubricants required understanding the fundamental interactions of solid surfaces with the synthetic lubricants.

Up until the late 1950s, it was extremely difficult to understand the nature of solid surfaces since vacuum technology was not sufficiently advanced to allow evaluations under ultrahigh vacuum conditions. High vacuum technology prior to the late 1950s permitted only low vacuum pressures of no less than about 10-6 torr. The solid surface studied must be carefully controlled to avoid surface contamination and results related to the oxide film instead of the ceramic. After the development of high vacuum technology it was possible, in the early 1960s, to obtain clean, solid surfaces for study since low pressures of less than about $10^{-8}$ torr became possible. It therefore became feasible to study the frictional properties of atomically clean surfaces.

Concomitant with or shortly thereafter the development of this increased capability with respect to the creation and maintaining of high vacuum environments, sophisticated analytical tools became available which permitted analysis of the surfaces under study. Some of the most important tools include low energy electron defraction, Auger electron spectroscopy, and x-ray photo electron spectroscopy.

A considerable amount of research has gone into studying the topography of solid surfaces. The surface profilometer is a useful tool for comparing and identifying solid surfaces. When used to compare one surface with another and show the differences that have taken place in the surface as the result of wear processes, it has been found that the nature of a solid surface often changes with abrasion very markedly from the surface just prior to the initiation of relative motion between two solid surfaces. Metals, for instance steel, have been more commonly studied with respect to surface changes as a result of sliding or rolling contact. Studies have shown that the wear on such surfaces can be characterized as either "adhesive" wear or "abrasive" wear. Abrasive wear is frequently observed with a steel surface in oxygen rich environments in which iron oxide is present on the surface of the steel. Abrasive wear often produces a very smooth surface topography. On the other hand, adhesive wear can produce a very rough surface topography. In contrast to the study of metal surfaces, ceramic and metal-ceramic (cermet) surfaces have been less frequently studied with respect to adhesive or abrasive wear effects. Generally the term cermet is used to describe a ceramic matrix having metallic particles physically dispersed therein. The term is also used to describe the reverse, that is, a metal matrix having dispersed therein ceramic materials which impart ceramic-like characteristics to the cermet. Useful representative metals for forming cermets are chromium, copper, cobalt, iron, nickel, lead, molybdenum, and tungsten.

Friction has been defined as the resistance to tangential motion of one solid-state contact surface moving over another. The motion can be rolling or rubbing contact motion. Friction is divided into static and dynamic types. Static friction is the force required to move two solid surfaces or alternatively, the force necessary to break adhesive bonds formed at the interface between two solid surfaces. Dynamic friction is associated with rubbing, rolling, or sliding of one surface over a second surface. Dynamic friction is an average force measurement obtained during such a rubbing, sliding, or rolling process. The term coefficient of friction is used to describe the resistance to tangential motion between two solid surfaces. It is the frictional force divided by the load applied to the two surfaces in contact.

It is well known that two atomically clean, smooth metal surfaces coming into solid-state contact stick together. The sticking together of solid surfaces is often observed when such surfaces are placed in a high vacuum system in which surface oxide films or other contaminants are removed. This sticking together is explained by the development of strong adhesive bonding between the two surfaces. It is significant that small concentrations of oxygen admitted into the vacuum environment bring about marked reductions in the coefficient of friction between two solid-state surfaces. This effect is well known between two iron surfaces; iron is thought to react with the oxygen to form an iron oxide film on the solid-state surfaces thus reducing the "cleanliness" and also the coefficient of friction between the surfaces. This film acts as a lubricant because it insulates the surfaces so as to prevent the adhesion that would normally result between atomically clean, smooth surfaces.

In addition to metallurgical and physical characteristics of solid surfaces having an influence on the adhesion, coefficient of friction, wear, and lubrication of solid surfaces, surface chemistry is important in understanding the frictional characteristics of solid-state surfaces. It has been found that mechanical "working" rolling or rubbing the surface creates an enhanced surface reactivity. That is, the very fact of the mechanical action or activity at the surface results in a heightened chemical reactivity, as compared to the chemical reactivity of the surface under static conditions. For instance, two surfaces in solid-state contact may have the corrosivity of the surfaces enhanced substantially over that which is characteristic of the surfaces under static conditions. Similarly, metals which are under strained environmental constraints are susceptible to heightened chemical reactions. When such reactions occur to produce reaction products on the surface, the solid-state adhesion, friction, and wear properties of the solid surfaces are substantially changed.

Specifically, with respect to the frictional properties of ceramics and metal-ceramics under sliding contact conditions in a high vacuum of about $10^{-10}$ torr, the friction and wear behavior of single-crystal silicon carbide has been studied in contact with itself and in contact with various metals by Miyoshi and Buckley, *Friction and Wear Behavior of Single-Crystal Silicon Carbide in Sliding Contact with Various Metals* in ASLE Transactions, vol. 22, 3, 245–256 (1978). These investigators found that when loads of 5 to 50 grams were applied to a silicon carbide pin-disc contact at 25° C. under a vacuum pressure of $10^{-8}$ newtons per square meter with a sliding velocity of 3 milimeters per minute and a total sliding distance of 2.5 milimeters, that the coefficient of friction was generally constant.

Similar results are provided in *NASA Technical Memorandum 81547, Anisotropic Tribological Properties of Silicon Carbide* by Miyoshi and Buckley (1981). These investigators found that the coefficient of friction for a silicon carbide pin riding over a silicon carbide surface in vacuum was generally constant at 0.6. Fischer and Tomizawa, *Interaction of Tribochemistry and Microfracture in the Friction and Wear of Silicon Nitride*, Wear, 105, 29–45 (1985) more recently have found that $Si_3N_4$ pins sliding in air on $Si_3N_4$ plates provide a coefficient of friction which initially starts at a relatively low value (0.4–0.6) and thereafter reaches a stable value of 0.7–0.8. The higher the load, the faster the stable value is reached.

These results and the generally understood knowledge in the prior art would not suggest the applicants' process in which an oxide film is produced tribochemically on a ceramic body riding on a ceramic flat surface or the applicants' process for welding opposed ceramic surfaces.

SUMMARY OF THE INVENTION

There are disclosed articles useful as bearing surfaces in outer space and a process for the production of said articles having an oxide surface layer on a ceramic or ceramic-metal surface.

In the tribochemical process of the invention, a ceramic or ceramic-metal surface is oxidized by compressing it against an articulating ceramic or ceramic-metal surface with a sliding or rolling movement of one surface against the other under high vacuum. Thereafter, less than atmospheric pressure (about 1500 pascal to about less than 10,000 pascal) of oxygen or air is admitted into the vacuum chamber while continuing the compressing of said surfaces by sliding or rolling movement of one surface against another. Surprisingly, welded surfaces occur when the above high vacuum step is followed by a second step, as above, except that the pressure of air or oxygen is increased to about 100 to about 1000 pascals.

DETAILED DESCRIPTION OF THE INVENTION AND THE PREFERRED EMBODIMENTS

As indicated above, only recently have test methods become available for the study of atomically clean surfaces. The method of operation of some of the most useful analytical tools will be described herein. More detailed description of surface analysis methods used in evaluation of the effects on solid surfaces of adhesion, friction, wear and lubrication are described by Buckley in *Surface Effects in Adhesion, Friction, Wear, and Lubrication*, Tribology Series, 5, Elsevier Scientific Publishing Company (1981), which is incorporated herein by reference.

The scanning electron microscope is perhaps the single most useful analytical tool for studying the behavior of solid surfaces. This instrument provides an extremely detailed physical picture of a solid surface and one which is easily obtained without requiring special skill on the part of the operator, in contrast to the conventional transmission electron microscope. Simply placing the sample to be analyzed into the chamber of the scanning electron microscope (SEM) and evacuating the chamber to the required vacuum permits examination of the solid surface. Generally such wear apparatus involves a stylus (pin or rider) which is positioned so as to contact a disc or flat surface which is mounted for movement against the stylus. Strain gauges can be incorporated into such an apparatus to measure frictional force.

Another extremely versatile surface analytical tool is Auger electron spectroscopy (AES). In AES an electron beam source is used to excite a solid surface. Chemical analysis of the solid surface is obtained using this tool in that by AES all elements present on the solid surface can be analyzed (with the exception of hydrogen or helium) at surface concentrations of as little as 1/100th of a monolayer. AES can provide depth analysis of a solid surface to a level of 4 or 5 atomic layers. In AES, a primary beam of electrons having a voltage of about 1000 to about 10,000 electron volts is directed at the solid surface. The beam of electrons strikes the solid surface and penetrates the electron shells of the atoms of the outermost atomic layers. Penetrating the electron shells causes inner level electron shell ionization. Energy is liberated thereby and electrons are removed from the electron shells of the atoms in the outermost atomic layer. The electron which is ejected from the solid surface is referred to as the Auger electron. Measurement of the energy of this electron provides identification of the particular atomic species on the solid surface from which it was obtained since each electron has a characteristic energy dependent upon the particular solid surface from which it originates.

The hardness, high temperature stability and chemical inertness of ceramics gives them unique properties that have resulted in their increasing use in severe service situations. With respect to ceramic materials, a number of interesting and still unanswered questions remain with respect to the interaction of friction and wear. For example, clean ceramics are widely believed to possess lower friction coefficients as compared to metals. It is well known that ambient humidity in the environment of a ceramic sliding against itself causes a reduction in wear in some cases and is detrimental, causing increased wear, in other cases. It remains unclear to what extent the wear and friction properties of a ceramic are intrinsic as compared to those properties which are dependent upon environmental effects (absorbed surface films). The previously cited literature references in the prior art section of this application have indicated that silicon carbide sliding upon itself under conditions of high vacuum has a constant coefficient of friction of about 0.6. More recent results by Fischer and Tomizawa in *Wear*, 105 29–45 (1985) indicate that silicon nitride sliding upon itself in air has an even higher friction coefficient.

In this specification and claims, the term "ceramic" is intended to define those materials having a hardness greater than about 1000 kilograms per square meter on the Vickers scale. Representative ceramics are boron carbide, aluminum oxide, silicon carbide, silicon nitride, aluminum nitride, titanium carbide, tungsten carbide, and tantalum nitride.

In a manner somewhat similar to the procedure of Fischer and Tomizawa, but under high vacuum, i.e., less than $10^{-8}$ torr (1 torr is equal to about 133 pascals) a boron carbide pin and a boron carbide flat both polished using diamond paste to about a 1 micrometer surface finish were placed in a pin-on-flat device enclosed in a vacuum system at a pressure of about $10^{-10}$ to about $10^{-3}$ pascal. Load on the pin was about 0.05 to about 0.025 newton using a sliding velocity of about 5 to about 30 millimeters per minute (1 newton is equal to 1 kilogram meter per second square). Subsequent to insertion in the vacuum system, the boron carbide components were cleaned using argon ion bombardment. The boron carbide pins and flats were hot pressed from boron carbide powder tradenamed ESK 1500 obtained from ESK Engineering Ceramic, Munich, Federal Republic of Germany. The substrates were prepared by hotpressing at 5000 lbs/in$^3$ at 2100° C. for approximately one hour into cylinders having a diameter of 1.2 centimeters and thickness of 0.3 centimeters. The total boron to total carbon atomic ratios in the ESK 1500 powder is 4.1. Oxygen, nitrogen, iron, calcium, and titanium are the most abundant impurities found in these powders. Oxygen and nitrogen each were present in the amount of 0.5%–1.0%. Iron and calcium were each found to be no greater than 0.01%. Titanium was found to be 0.01–0.07%.

The boron carbide pin used generally has about a 5 millimeter radius, although it is believed this is not critical to the invention. Both pin and flat are generally polished to a surface greater than or equal to about 1 micrometer. The friction measurements were conducted utilizing a pin-on-flat device built by McAllister Technical Services, Berkeley, Calif. Surface analysis was conducted using Auger electron spectroscopy (AES). Transfer of the disc subsequent to wear testing can be accomplished in this device utilizing "wobble" sticks for moving specimens to and from the deflection bar and collet holder. A rotary feed through allows turning the collet to rigidly secure the sample. Adjusting the tension by a cable wire is accomplished using a cable control which locks the mating surfaces in place. The entire deflection bar assembly can be rotated 180° to bring the two surfaces into contact. Two sets of four bakable strain gauges and a conditioner are used to measure load and adhesion forces as low as 0.005 newton. The forces are calibrated using 0.0005 to 0.15 kilogram weights. The load applied to the specimens of 0.10–0.13 newton is applied to the specimens by simply translating the deflection bar along a load force direction until the desired load is indicated. The pin, secured to the deflection bar was typically cycled in an oscillatory linear velocity of about 5 to about 30 milimeters per minute over a $1 \times 10^{-3}$ meter distance in a direction perpendicular to the applied load using a stepper motor. Higher pin velocity surface conditioning was conducted over the same distance using the load but at a $3 \times 10^{-4}$ meter per second velocity. A computer was used to digitally record the load, adhesion, and coefficient of friction as a function of time.

EXAMPLE I

A boron oxide wear track essentially free of carbon contamination was prepared utilizing a boron carbide surface (disc) upon which a boron carbide rider articulates. The boron carbide pin had a 5 mm radius and the boron carbide disc, as well as the boron carbide pin, were polished to about a 1 micrometer surface finish. Both boron carbide pin and disc were placed into a vacuum system at a pressure of $10^{-7}$ pascal and a 0.12 newton force was applied to the junction of the pin and disc. It is noted that no in situ surface cleaning is necessary in the process of the invention. The pin is made to slide over the disc at a velocity of 18 mm per minute during which a high coefficient of friction occurs having a value of about 1.0. Thereafter, air is admitted into the vacuum system to a pressure of 1500 pascal to less than 10,000 pascal, while continuing the sliding of the pin over the disc under the conditions described above. Monitoring the friction indicates that the friction is decreasing under these conditions. When a coefficient of friction value of about 0.2, the vacuum pump is started and the system is returned to a pressure of about $10^{-7}$ pascal. Under high vacuum, the coefficient of friction in the wear track increased to about 1.0–1.5. Utilizing Auger spectroscopy, it was found that, in the wear track, the original boron carbide surface has been covered with a non-uniform boron oxide surface layer, which in some places is two to three times the thickness of the monolayer which would be obtained upon exposure of a clean surface to that pressure of air. The boron oxide is essentially free of carbon contamination. Repeating the above procedure further oxidized the surface.

EXAMPLE II (control, forming no part of this invention.)

Instead of producing a wear track on a boron carbide disc utilizing a boron carbide pin, as described above, starting in a vacuum, the same process was performed starting at one atmosphere of pressure. The coefficient of friction was found to be about 0.2 during the process of producing the wear scar. Utilizing Auger spectroscopy to examine the composition of the wear scar, it was found that there is no evidence of enhanced oxidation to produce a boron oxide surface layer on the boron carbide in the wear scar. Under high vacuum conditions ($10^{-7}$ pascal) the coefficient of friction in the wear scar was 1.0–1.5.

EXAMPLES III–IX

The procedure of Example I is repeated utilizing instead of boron carbide, silicon carbide, silicon nitride, titanium carbide, tungsten carbide, tantalum nitride, and aluminum nitride. Similar results as compared to Example I are found, namely, the process of initiating the wear scar under high vacuum and continuing the formation of the wear scar at less than atmospheric pressure results in the tribochemical formation of an oxide surface layer in the wear scar. Thus, for instance, silicon carbide wear scars are found to contain silicon oxide; silicon nitride wear scars are found to contain silicon oxide; and aluminum nitride wear scars are found to contain aluminum oxide upon examination using Auger spectroscopy.

EXAMPLE X

Example I was repeated except that the pressure admitted into the vacuum system was 100 pascals of dry oxygen. Upon measuring the friction in dry oxygen, the friction coefficient was found to be 1.5 to 2.5. Upon examination of the wear track surface, it was found that needles of the ceramic were formed on the wear track surface which lie at a perpendicular angle to the direction of the wear track. It was expected that as oxygen gas pressure was increased from $10^{-5}$ pascals up to atmospheric pressure (10,000 pascals) that there would be a smooth monotonically decreasing transition from its high value in vacuum (1 0-1.5) to its lower value in air (0.2-0.4). Instead, the unexpected large increase in the coefficient of friction was surprising, and suggests that some of the time welding of the two surfaces occurred, and thus suggests this procedure as a method of welding two ceramic or ceramic-metal surfaces.

EXAMPLE XI

Example I is repeated using a cermet formed by hot pressing and sintering having the following composition: 60 mol. % aluminum oxide, 40 mol. % silicon nitride into which tungsten particles are mixed in a proportion of 20% tungsten particles and 80% ceramic particles. Substantially the same oxide layer is formed as in Example I.

EXAMPLE XII

Example X is repeated using a cermet formed by hot pressing and sintering having the following composition 60 mol. % aluminum oxide, 40 mol. % silicon nitride into which tungsten particles are mixed in a proportion of 20% tungsten particles and 80% ceramic particles. Substantially the same welding is obtained.

EXAMPLES XIII-XIX

The procedure of Example X is repeated utilizing instead of boron carbide, silicon carbide, silicon nitride, titanium carbide, tungsten carbide, tantalum nitride and aluminum nitride. Similar results as compared to Example X are found.

While this invention has been described with reference to certain specific embodiments, it will be recognized by those skilled in the art that many variations are possible without departing from the scope and spirit of the invention and it will be understood that it is intended to cover all changes and modifications of the invention disclosed for the purposes of illustration which do not constitute departures from the spirit and scope of the invention.

The embodiments of the invention in which an exclusive property or privilege is claimed are defined as follows:

1. A tribochemical method for producing oxidized surfaces on opposed surfaces of ceramic or metal-ceramic articles, said method comprising the steps of:

A. compressing under high vacuum at room temperature said opposed surfaces with sliding movement of one of said surfaces against an opposed said surface and, thereafter, B. repeating step A in the presence of air or oxygen at a pressure of about 10 to less than about 10,000 pascal.

2. The method of claim 1 wherein said ceramic has a hardness of greater than about 1000 kilograms per square meter on the Vickers scale, said surfaces are in the form of a pin and flat, polished to a surface finish of greater than or equal to about one micrometer, said surfaces are under a vacuum of about $10^{-10}$ to about $10^{-5}$ pascal in step A and, thereafter, step B is continued until the coefficient of friction is reduced to about 0.2 to about 0.4.

3. The method of claim 2 wherein said pin is caused to slide over said flat at a velocity of about 5 to about 30 millimeters per minute and step B is conducted at a pressure of about 10 to about 8000 pascals.

4. The method of claim 3 wherein said pin has a radius of about 5 millimeters; said ceramic has a hardness greater than about 1000 kilograms per square meter on the Vickers scale; said force applied to said pin and flat is a force of about 0.12 newton; and wherein steps A and B are repeated in order to further oxidize said surface.

5. The method of claim 4 wherein said ceramic is selected from the group consisting of aluminum oxide, boron carbide, silicon carbide, silicon nitride, aluminum nitride, titanium carbide, tungsten carbide, tantalum nitride, and mixtures thereof.

6. The method of claim 5 wherein said ceramic is boron carbide.

7. Ceramic or metal-ceramic articles having an oxidized surface on at least one articulating surface with a second ceramic or metal-ceramic surface comprising an oxidized, articulated ceramic or metal-ceramic surface obtained by the process of claim 1.

8. The article of claim 7 wherein said ceramic is selected from the group consisting of boron carbide, silicon carbide, silicon nitride, and aluminum nitride.

9. The article of claim 8 wherein said ceramic is boron carbide.

10. Welded ceramic or metal-ceramic articles comprising ceramic of metal-ceramic welded surfaces obtained by the process of claim 1.

11. The article of claim 10 wherein said ceramic is selected from the group consisting of boron carbide, silicon carbide, silicon nitride, and aluminum nitride.

12. The article of claim 11 wherein said ceramic is boron carbide.

13. The method of claim 3, wherein step B is conducted at a pressure of about 800 to about 2000 pascals.

* * * * *